United States Patent
Subrahmanyam et al.

(10) Patent No.: US 10,929,233 B2
(45) Date of Patent: *Feb. 23, 2021

(54) APPLICATION HIGH AVAILABILITY VIA APPLICATION TRANSPARENT BATTERY-BACKED REPLICATION OF PERSISTENT DATA

(71) Applicant: VMware, Inc., Palo Alto, CA (US)

(72) Inventors: Pratap Subrahmanyam, Saratoga, CA (US); Rajesh Venkatasubramanian, San Jose, CA (US); Kiran Tati, Fremont, CA (US); Qasim Ali, Santa Clara, CA (US); Marcos Aguilera, Mountain View, CA (US); Irina Calciu, Palo Alto, CA (US); Venkata Subhash Reddy Peddamallu, Sunnyvale, CA (US); Xavier Deguillard, Mountain View, CA (US); Yi Yao, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/881,379

(22) Filed: Jan. 26, 2018

(65) Prior Publication Data
US 2019/0129812 A1 May 2, 2019

Related U.S. Application Data

(60) Provisional application No. 62/578,323, filed on Oct. 27, 2017.

(51) Int. Cl.
*G06F 11/14* (2006.01)
*G06F 16/27* (2019.01)
(Continued)

(52) U.S. Cl.
CPC ......... *G06F 11/1438* (2013.01); *G06F 1/263* (2013.01); *G06F 11/1464* (2013.01);
(Continued)

(58) Field of Classification Search
CPC .............. G06F 11/1471; G06F 11/203; G06F 11/2041; G06F 11/2043
See application file for complete search history.

(56) References Cited

U.S. PATENT DOCUMENTS 8,953,439 B1 * 2/2015 Lin ..................... G06F 11/1484 370/219
9,164,856 B2 10/2015 Harpaz et al.
(Continued)

OTHER PUBLICATIONS

J. Zhao, O. Mutlu, and Y. Xie. FIRM: Fair and High-Performance Memory Control for Persistent Memory Systems. In International Symposium on Microarchitecture, 2014.
(Continued)

*Primary Examiner* — Jigar P Patel (57) ABSTRACT

Techniques for achieving application high availability via application-transparent battery-backed replication of persistent data are provided. In one set of embodiments, a computer system can detect a failure that causes an application of the computer system to stop running. In response to detecting the failure, the computer system can copy persistent data written by the application and maintained locally at the computer system to one or more remote destinations, where the copying is performed in a manner that is transparent to the application and while the computer system runs on battery power. The application can then be restarted on another computer system using the copied data.

15 Claims, 5 Drawing Sheets

(51) Int. Cl.
    G06F 1/26      (2006.01)
    G06F 11/20     (2006.01)
(52) U.S. Cl.
    CPC ...... *G06F 11/1471* (2013.01); *G06F 11/1484* (2013.01); *G06F 11/2025* (2013.01); *G06F 16/27* (2019.01); *G06F 2201/805* (2013.01); *G06F 2201/82* (2013.01); *G06F 2201/84* (2013.01); *G06F 2201/85* (2013.01)

(56) References Cited

U.S. PATENT DOCUMENTS

| | | | |
|---|---|---|---|
| 9,645,901 | B2 | 5/2017 | Nagaraj |
| 2002/0143798 | A1 | 10/2002 | Lisiecki |
| 2007/0150760 | A1 | 6/2007 | Nowlin |
| 2010/0043010 | A1 | 2/2010 | Yokoyama et al. |
| 2012/0042196 | A1* | 2/2012 | Aron ............... G06F 11/2028 714/4.11 |
| 2013/0067168 | A1* | 3/2013 | Havewala ........ G06F 12/0866 711/118 |
| 2014/0115310 | A1* | 4/2014 | Smith .............. H04L 49/65 713/2 |
| 2014/0201574 | A1* | 7/2014 | Manchek ......... G06F 11/1407 714/38.13 |
| 2014/0325116 | A1* | 10/2014 | McKelvie ........ G06F 12/0246 711/103 |
| 2016/0335006 | A1* | 11/2016 | Rose ............... G06F 3/0679 |
| 2016/0378623 | A1 | 12/2016 | Kumar et al. |
| 2018/0074968 | A1 | 3/2018 | Bk et al. |
| 2018/0095879 | A1 | 4/2018 | Han et al. |
| 2018/0107596 | A1 | 4/2018 | Kelly et al. |
| 2018/0239725 | A1 | 8/2018 | Kumar et al. |
| 2018/0357139 | A1* | 12/2018 | Delgado Campos ............ G06F 11/2023 |

OTHER PUBLICATIONS

HammerDB benchmark. https://www.hammerdb.coml. Site updated Apr. 2018.
HPE scalable persistent memory. https://www.hpe.com/us/en/servers/persistent-memory.html. Uploaded Aug. 17, 2018.
Intel Xeon processor E7 family: Reliability, availability, and serviceability. https://www.intel.com/content/www/us/en/processors/xeon/xeon-e7-family-ras-server-paper.html. Copyright 2011.
Micron NVDIMMs: Persistent memory performance. https://www.micron.com/~/media/documents/products/product-flyer/nvdimm\_flyer.pdf. 2016.
Persistent memory programming. http://pmem.io/. Dec. 2017.
NVM programming model (NPM). https://www.snia.org/tech\_activities/standards/curr\_standards/npm. Dec. 2013.
Sysbench benchmark. https://github.com/akopytov/sysbench. Copyright 2018 .
Magic quadrant for x86 server virtualization infrastructure. https://www.gartner.com/doc/2788024/magic-quadrant-x-server-virtualization, Jul. 2014 (republished Aug. 2016).
Intel and Micron Produce Breakthrough Memory Technology. New Class of Memory Unleashes the Performance of PCs, Data Centers and More. http://files.shareholder.com/downloads/ABEA-45YXOQ/5284651856x0x841530/7852AA28-4E57-4D8F-A180-FA135F0BC406/Micron-Intel\_Next\_Gen\_NVM\_Press\_Release\_FINAL\_072815.pdf. 2015.
J. Arulraj, A. Pavlo, and S. R. Dulloor. Let's talk about storage & recovery methods for non-volatile memory database systems. In International Conference on Management of Data, pp. 707-722, 2015.
E. Berg and E. Hagersten. StatCache: A probabilistic approach to efficient and accurate data locality analysis. In International Symposium on Performance Analysis of Systems and Software, pp. 20-27, Mar. 2004.

K. Bhandari, D. R. Chakrabarti, and H.-J. Boehm. Makalu: Fast recoverable allocation of non-volatile memory. In Objectoriented Programming, Systems, Languages, and Applications, pp. 677-694, 2016.
H.-J. Boehm and D. R. Chakrabarti. Persistence programming models for non-volatile memory. In International Symposium on Memory Management, pp. 55-67, 2016.
D. R. Chakrabarti, H.-J. Boehm, and K. Bhandari. Atlas: Leveraging locks for non-volatile memory consistency. In Object-oriented Programming, Systems, Languages, and Applications, 2014.
J. Coburn, A. M. Caulfield, A. Akel, L. M. Grupp, R. K. Gupta, R. Jhala, and S. Swanson. Nv-heaps: Making persistent objects fast and safe with next-generation, non-volatile memories. In International Conference on Architectural Support or Programming Languages and Operating Systems, 2011.
Doug Voigt. RDMA requirements for high availability in the NVM programming model. https://www.snia.org/sites/default/files/DougVoigt\_RDMA\_Requirements\_for\_HA.pdf. Storagae Developer Conference, Santa Clara, 2016.
A. Dragojevi'c, D. Narayanan, O. Hodson, and M. Castro. FaRM: Fast remote memory. In Symposium on Networked Systems Design and Implementation, pp. 401-414, 2014.
A. Dragojevi'c, D. Narayanan, E. B. Nightingale, M. Renzelmann, A. Shamis, A. Badam, and M. Castro. No compromises: Distributed transactions with consistency, availability, and performance. In ACM Symposium on Operating Systems Principles, pp. 54-70, 2015.
M. Friedman, M. Herlihy, V. Marathe, and E. Petrank. Brief Announcement: A Persistent Lock-Free Queue for Non-Volatile Memory. In International Symposium on Distributed Computing, vol. 91, pp. 50:1-50:4, 2017.
Intel. 3D XPoint™ Unveiled—The Next Breakthrough in Memory Technology. http://www.intel.com/content/www/us/en/architecture-and-technology/3d-xpoint-unveiled-video.html.
Intel. Intel architecture instruction set extensions programming reference. https://software.intel.com/sites/default/files/managed/69/78/319433-025.pdf, pp. 24-104, Jul. 2012.
Viyojit: Decoupling battery and DRAM capacities for batterybacked DRAM. In International Symposium on Computer Architecture, pp. 613-626, Jun. 2017.
A. Kolli, S. Pelley, A. Saidi, P. M. Chen, and T. F. Wenisch. High-performance transactions for persistent memories. In International Conference on Architectural Support for Programming Languages and Operating Systems, pp. 399-411, 2016.
A. Kolli, J. Rosen, S. Diestelhorst, A. G. Saidi, S. Pelley, S. Liu, P. M. Chen, and T. F. Wenisch. Delegated persist ordering. In International Symposium on Microarchitecture, pp. 1-13, 2016.
A. Kolli, V. Gogte, A. G. Saidi, S. Diestelhorst, P. M. Chen, S. Narayanasamy, and T. F. Wenisch. Language-level persistency. In International Symposium on Computer Architecture, pp. 481-493, 2017.
E. Kultursay, M. Kandemir, a. Sivasubramaniam, and 0. Mutlu. Evaluating Stt-Ram as an energy-efficient main memory alternative. In International Symposium on Performance Analysis of Systems and Software, 2013.
S. Lai. Current status of the phase change memory and its future. In International Electron Devices Meeting, 2003.
B. C. Lee, E. Ipek, O. Mutlu, and D. Burger. Architecting Phase Change Memory As a Scalable DRAM Alternative. In International Symposium on Computer Architecture, 2009.
B. C. Lee, P. Zhou, J. Yang, Y. Zhang, B. Zhao, E. Ipek, O. Mutlu, and D. Burger. Phase Change Technology and the Future of Main Memory. International Symposium on Microarchitecture, 2010.
V. J. Marathe, M. Seltzer, S. Byan, and T. Harris. Persistent memcached: Bringing legacy code to byte-addressable persistent memory. In USENIX Workshop on Hot Topics in Storage, Santa Clara, CA, 2017.
I. Moraru, D. G. Andersen, M. Kaminsky, N. Tolia, P. Ranganathan, and N. Binkert. Consistent, durable, and safe memory management for byte-addressable non volatile main memory. In SIGOPS Conference on Timely Results in Operating Systems, 2013.
S. Nalli, S. Haria, M. D. Hill, M. M. Swift, H. Volos, and K. Keeton. An analysis of persistent memory use with whisper. In International (56) References Cited

OTHER PUBLICATIONS

Conference on Architectural Support for Programming Languages and Operating Systems, pp. 135-148, 2017.

D. Narayanan and O. Hodson. Whole-system Persistence. In International Conference on Architectural Support for Programming Languages and Operating Systems, pp. 401-410, New York, NY, USA, 2012.

F. Nawab, J. Izraelevitz, T. Kelly, C. B. M. III, D. R. Chakrabarti, and M. L. Scott. Dali: A Periodically Persistent Hash Map. In International Symposium on Distributed Computing, vol. 91, pp. 37:1-37:16, 2017.

S. Pelley, P. M. Chen, and T. F.Wenisch. Memory Persistency. In International Symposium on Computer Architecture, 2014.

J. Ren, J. Zhao, S. Khan, J. Choi, Y. Wu, and O. Mutlu. ThyNVM: Enabling software-transparent crash consistency in persistent memory systems. In International Symposium on Microarchitecture, 2015.

Rob Davis, Chet Douglas, Paul Grun, Tom Talpey. Persistent memory over fabrics. https://www.flashmemorysummit.com/English/Collaterals/Proceedings/2017/20170809_FR22_Davis.pdf. 2017.

Y. Shan, S. Tsai, and Y. Zhang. Distributed shared persistent memory. In ACM Symposium on Cloud Computing, pp. 323-337, 2017.

D. B. Strukov, G. S. Snider, D. R. Stewart, and R. S.Williams. The missing memristor found. Nature, 2008.

A. S. Tanenbaum and H. Bos. Modern operating systems. Prentice Hall Press, 4th edition, 2014.

S. Venkataraman, N. Tolia, P. Ranganathan, and R. H. Campbell. Consistent and durable data structures for non-volatile byte-addressable memory. In USENIX Conference on File and Storage Technologies, 2011.

H. Volos, A. J. Tack, and M. M. Swift. Mnemosyne: Lightweight persistent memory. In International Conference on Architectural Support for Programming Languages and Operating Systems, 2011.

C. A. Waldspurger, N. Park, A. Garthwaite, and I. Ahmad. Efficient MRC construction with SHARDS. In USENIX Conference on File and Storage Technologies, pp. 95-110, Feb. 2015.

J. Xu and S. Swanson. Nova: A log-structured file system for hybrid volatile/non-volatile main memories. In USENIX Conference on File and Storage Technologies, pp. 323-338, 2016.

J. Xu, L. Zhang, A. Memaripour, A. Gangadharaiah, A. Borase, T. B. D. Silva, S. Swanson, and A. Rudoff. Novafortis: A fault-tolerant non-volatile main memory file system. In ACM Symposium on Operating Systems Principles, pp. 478-496, 2017.

Y. Zhang, J. Yang, A. Memaripour, and S. Swanson. Mojim: A reliable and highly-available non-volatile memory system. In International Conference on Architectural Support for Programming Languages and Operating Systems, pp. 3-18, 2015.

* cited by examiner

APPLICATION HIGH AVAILABILITY VIA APPLICATION TRANSPARENT BATTERY-BACKED REPLICATION OF PERSISTENT DATA

CROSS-REFERENCES TO RELATED APPLICATIONS

The present application claims priority to U.S. Provisional Patent Application No. 62/578,323, filed Oct. 27, 2017, entitled "Crash Consistent Persistent Memory Replication and Battery-Backed Virtual Machine Availability."

In addition, the present application is related to the following commonly-owned U.S. Patent Applications, filed concurrently herewith:
- U.S. patent application Ser. No. 15/881,514 entitled "Application High Availability via Crash-Consistent Asynchronous Replication of Persistent Data"; and
- U.S. patent application Ser. No. 15/881,480 entitled "Application Fault Tolerance via Battery-Backed Replication of Volatile State."

The entire contents of all of the foregoing provisional and nonprovisional applications are incorporated herein by reference for all purposes.

BACKGROUND

In computing, the term "availability" refers to the percentage of time for which an entity (e.g., system, component, application, etc.) is accessible to consumers of that entity (e.g., end-users, other systems/components/applications, etc.) in a performant way. High availability (HA) is a goal that seeks to maximize availability and thus minimize downtime of the entity.

Traditional techniques for achieving HA for applications generally assume that the persistent data written by an HA-protected application is maintained on shared (i.e., networked) storage that is accessible by a multitude of host systems in a predefined HA domain (e.g., host cluster). The use of shared storage ensures that if the application's host system fails, the application can be quickly restarted in a crash-consistent manner on another operational host system in the HA domain since all such host systems will have access to the application's latest persistent data via the shared storage.

However, there are some deployment scenarios in which an application may write its persistent data to storage or persistent memory that is local to the host system on which the application is running. In these scenarios, if the application's host system fails (e.g., crashes, loses AC power, etc.), the local storage or persistent memory of the host system cannot be accessed by other machines while the host system is down. As a result, the application cannot be restarted and resume its operation in a crash-consistent manner until the failure is resolved, thereby decreasing its availability.

SUMMARY

Techniques for achieving application high availability via application-transparent battery-backed replication of persistent data are provided. In one set of embodiments, a computer system can detect a failure that causes an application of the computer system to stop running. In response to detecting the failure, the computer system can copy persistent data written by the application and maintained locally at the computer system to one or more remote destinations, where the copying is performed in a manner that is transparent to the application and while the computer system runs on battery power. The application can then be restarted on another computer system using the copied data.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure provide techniques for achieving HA for an application that writes persistent data to local (i.e., host-side) storage and/or persistent memory. These techniques leverage the fact that many host systems have, or can be easily modified to include, a battery which can power critical components of the system for some period of time after a power-related failure. Assuming such a battery is in place, the techniques described herein enable the host system to copy (i.e., replicate) some, or all, of the application's local persistent data to one or more remote destinations for HA purposes after the system has failed (since the host system will be able to run for a while post-failure on battery power, if needed). This, in turn, allows the application to be restarted on another machine in a crash-consistent manner—in other words, a manner that is consistent with the application's persistent state as of the time of the failure—while the original host system is down.

According to a first set of embodiments collectively referred to as the "application-transparent battery-backed replication" approach, an operating system (OS) or Basic Input/Output System (BIOS) of the host system can detect when a failure at the host system has occurred and, in response to the failure, can copy an allocation of local storage or local persistent memory used by the application to the remote destination(s). In some of these embodiments, the OS or BIOS can copy the entirety of the local storage/ persistent memory allocation to the remote destination(s) at the point of failure. In other embodiments, the OS or BIOS can proactively pre-copy dirty portions of the allocation to the remote destination(s) before a failure occurs (without requiring any help from, or modifications to, the application), and then copy any remaining portions post-failure.

According to a second set of embodiments collectively referred to as the "crash-consistent asynchronous replication" approach, the application itself can be configured to replicate its persistent data to the remote destination(s) on an asynchronous basis during application runtime. For example, when the application writes a piece of data to the local storage/persistent memory allocation, the application can also write that data to a log entry in a local log region, which is copied over to the remote destination(s) asynchronously. Thus, unlike conventional synchronous replication, the application does not need to confirm that each log entry is successfully copied to the remote destination(s) before continuing its execution. Then, when a failure occurs on the host system, the OS or BIOS can copy any outstanding log entries (or the entirety of the local log region) to the remote destination(s) while the host system runs on battery power (if needed), thereby ensuring that the remote destination(s) acquire a complete, crash-consistent copy of the data.

The foregoing and other aspects of the present disclosure are described in further detail below.

2. System Architectures

Figure 1A:
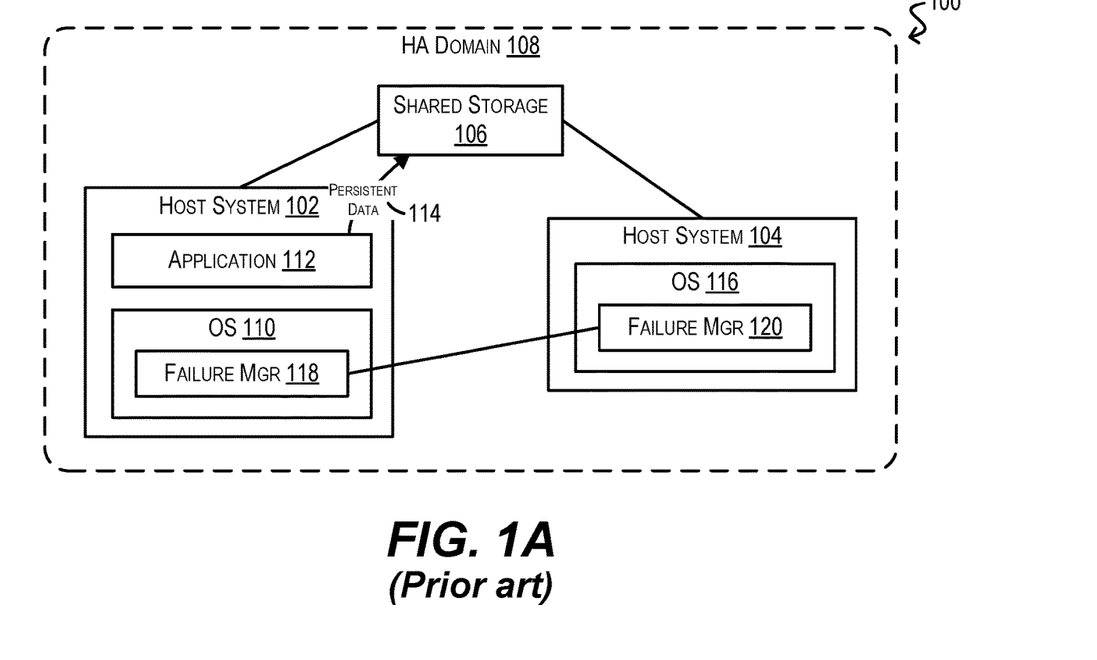
FIG. 1A depicts a system architecture that supports traditional application HA.

To provide context for the embodiments described herein, FIG. 1A is a simplified block diagram of a system architecture 100 that implements a traditional form of application HA. As shown, architecture 100 includes two host systems 102 and 104 and a shared storage component 106 that are part of a single HA domain 108 (although only two hosts are depicted, any number of hosts may be supported within domain 108). Host system 102 includes an OS 110 and an application 112 that is configured to write persistent data to shared storage 106 (shown via arrow 114). Host system 104 also includes an OS 116 but is idle (i.e., is not currently running any applications). OSs 110 and 116 can be conventional "bare-metal" OSs (e.g., Linux, Windows, etc.) or virtualization hypervisors (e.g., ESXi, Hyper-V, etc.). Similarly, application 112 can be a conventional software application or a virtual machine (VM).

Within OSs 110 and 116, host systems 102 and 104 further include failure managers 118 and 120 respectively, which are interconnected to form a distributed system. These failure managers are responsible for performing various traditional HA functions, such as keeping track of the host systems and applications in HA domain 108, detecting host/application failures, and restarting a failed application on an operational host system when a failure occurs. For example, assume an AC power loss event on host system 102 causes application 112 to stop running. In this scenario, failure manager 120 of host system 104 can determine that host system 102 has failed and can automatically restart application 112 on host system 104 so that it remains available to end-users or downstream consumers while the failure on host system 102 is investigated and fixed.

As mentioned in the Background section, the design of failure managers 118 and 120 generally require that the persistent data for application 112 (and all applications in HA domain 108) be maintained in shared storage 106. This requirement ensures, for example, that host system 104 can restart application 112 in a crash-consistent manner when host system 102 fails, since host system 104 has direct access to the most recent persistent data for application 112 via shared storage 106. This approach works well since almost all applications that manage persistent data (e.g., databases) are designed to recover from sudden system failures that require a restart.

Figure 1B:
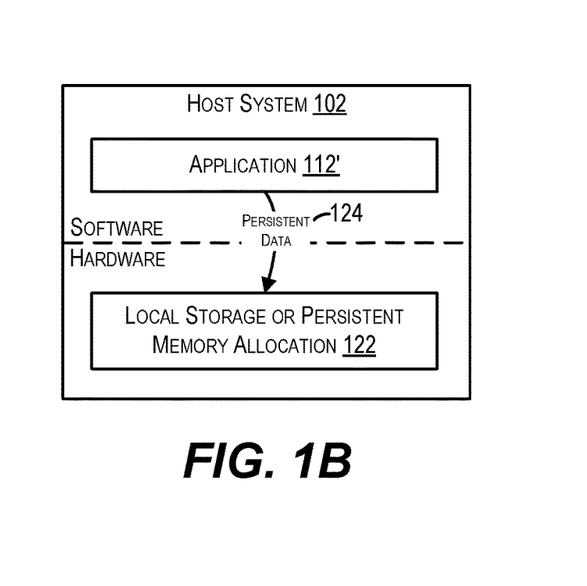
FIG. 1B depicts an application configured to write its persistent state to a local (i.e., host-side) storage or persistent memory.

However, it is becoming increasingly common in enterprise deployments for applications to write at least a portion of their persistent state to local storage or local persistent memory rather than to shared storage. An example of this is depicted in FIG. 1B, where a modified version of application 112 (shown as application 112') is now configured to write persistent data to a local storage or persistent memory allocation 122 that is part of host system 102 (shown via arrow 124). Local storage/persistent memory allocation 122 may be, e.g., a local magnetic hard disk, a local solid state disk (SSD), a local persistent memory (e.g., NVDIMM-N or NVDIMM-P), or a portion thereof. With the scenario depicted in FIG. 1B, if host system 102 fails, local storage/persistent memory allocation 122 cannot be accessed by host system 104 while host system 102 is down, which in turn means that application 112' cannot be restarted in a crash-consistent manner on host system 104 via conventional HA.

It is possible to address this via synchronous replication, which involves trapping every write to local storage/persistent memory allocation 122 at host system 102 synchronously copying the write data to host system 104 before sending a write acknowledgement to application 112'. However, synchronous replication is costly for storage I/O and is prohibitively costly for persistent memory I/O. When an application uses storage (block) I/O, synchronous replication adds extra latency to write operations (due to network copy latency and remote host write latency), but the storage I/O interface used by the application is asynchronous and designed to deal with higher latencies. When an application uses persistent memory I/O, the application uses load/store instructions to read and write data to persistent memory. Trapping each store instruction (i.e., forcing a page fault for every write and copying the resulting modification) is extremely costly and, for most applications, will make the application too slow to be practical.

Figure 2:
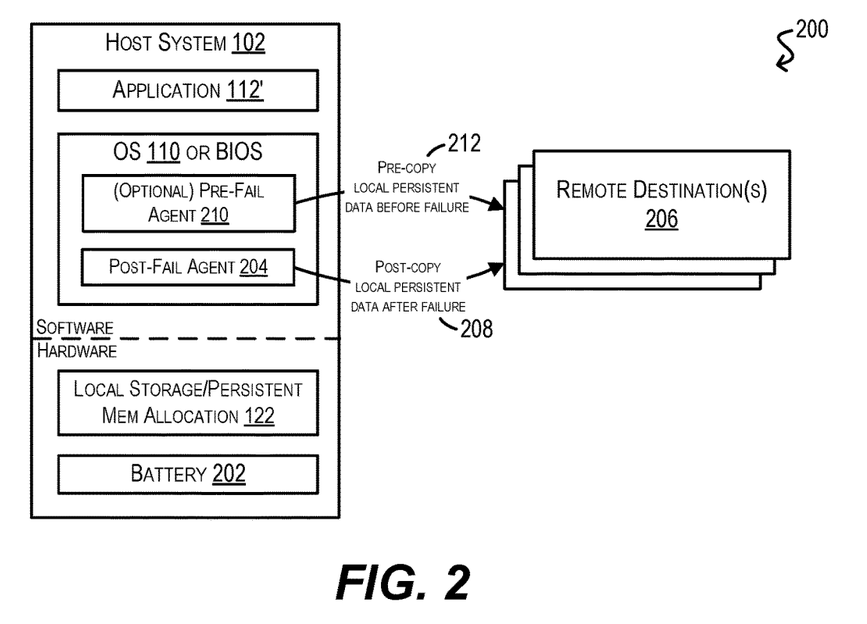
FIG. 2 depicts a system architecture for implementing application-transparent battery-backed replication according to an embodiment.
Figure 3:
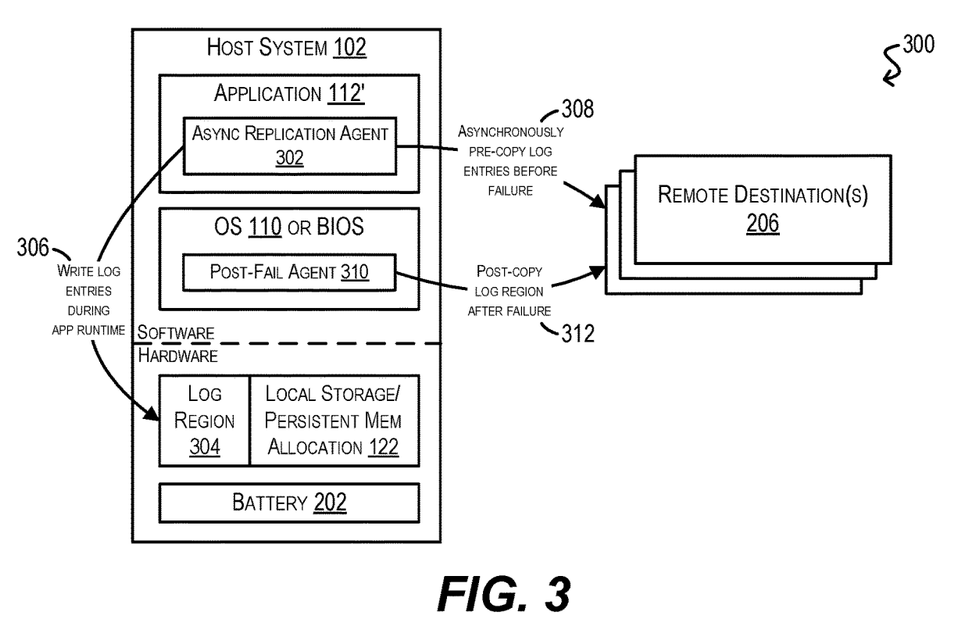
FIG. 3 depicts a system architecture for implementing crash-consistent asynchronous replication according to an embodiment.

To solve the foregoing and other similar problems, FIGS. 2 and 3 depict system architectures 200 and 300 respectively that reflect two high-level approaches for achieving HA for application 112' of host system 102 (i.e., an application that writes persistent data to local storage/persistent memory) according to embodiments of the present disclosure. The approach reflected in architecture 200 of FIG. 2 is referred to as "application-transparent battery-backed replication" and the approach reflected in architecture 300 of FIG. 3 is referred to as "crash-consistent asynchronous replication."

These two approaches share a couple of commonalities; first, they both assume host system 102 is modified to include a battery 202 that can power critical components of system 102 (e.g., CPU, memory, local storage, network interface) in cases where system 102 loses AC power. Battery 202 can take many different forms, such as an on-board battery (as found on certain types of persistent memory modules), an uninterruptible power supply (UPS), a commodity battery (e.g., laptop battery), and so on.

Second, the two approaches assume that the failure(s) experienced by host system 102 are of a type that allows system 102 to briefly execute some "panic" code post-failure. Examples of failures that allow for panic execution include crashes resulting from device driver/OS/firmware bugs (which can be handled by the OS or BIOS), uncorrectable memory errors (which also can be handled by the OS or BIOS), and AC power loss (which can be addressed for a limited period of time via battery 202). These approaches are not specifically designed to handle host failures where critical system components are destroyed or rendered completely inoperable; such unrecoverable failures require alternative availability techniques that are orthogonal to the embodiments of present disclosure, such as backups, geo-replication, and other disaster-tolerant solutions.

With respect to the application-transparent battery-backed replication approach/architecture of FIG. 2, the basic idea is that an application-transparent post-fail agent 204 implemented in OS 110 or the BIOS of host system 102 can, upon the occurrence of a host failure, replicate the contents of local storage/persistent memory allocation 122 to one or more remote destinations 206 (e.g., shared storage, local storage of another host system, local persistent memory of another host system, etc.). This process, referred to as "post-copying" and shown via arrow 208, can be executed as part of the panic code of host system 102, possibly with the aid of battery 202. With this general approach, the local persistent data of application 112' can be made accessible to another machine (e.g., host system 104) while host system 102 is down so that application 112' can be restarted on that other machine in a crash-consistent manner.

Notably, there are a few challenges with post-copying the entirety of local storage/persistent memory allocation 122 to remote destination(s) 206 at the point of failure—for example, the amount of persistent data in allocation 122 may be very large (e.g., on the order of hundreds of gigabytes or more) and/or the amount of network bandwidth between host system 102 and remote destination(s) 206 may be limited. Due to these factors, the post-copy phase can potentially take minutes or hours to complete, which may be unacceptable for some HA scenarios (and may exceed the length of system uptime supported by battery 202).

To address this, as shown in FIG. 2, OS 110 or the BIOS of host system 102 can also implement an optional pre-fail agent 210. Like post-fail agent 204, pre-fail agent 210 can operate transparently with respect to application 112'. In cases where pre-fail agent 210 is present/enabled, pre-fail agent 210 can track and proactively "pre-copy," to remote destination(s) 206, portions of local storage/persistent memory allocation 122 that are modified by application 112' before a host failure occurs (arrow 212). With this pre-copying, the time needed to complete the post-copy phase (which should only comprise copying the remaining dirty data in allocation 122 that was not copied during the pre-copy phase) can be advantageously reduced.

Turning now to FIG. 3, the basic idea behind the crash-consistent asynchronous replication approach/architecture depicted here is that an "async replication" agent 302 implemented in application 112' can asynchronously copy, to remote destination(s) 206, the persistent data written by application 112' to local storage/persistent memory allocation 122 during application runtime. For instance, when application 112' writes a piece of data to allocation 122, async replication agent 302 can also write that data to a log entry in a local log region 304 (arrow 306) and later copy the log entry to remote destination(s) 206 in the background (arrow 308). This results in lower application latency than conventional synchronous replication since application 112' does not need to wait for log entries to be successfully copied to remote destination(s) 206 before continuing with its execution; instead, async replication agent 302 can effectively decouple these remote copy operations from the application's local I/O path.

Then, at the time of a failure on host system 102, control can be transferred to an OS or BIOS-implemented post-fail agent 310 that is largely similar to post-fail agent 204 of FIG. 2. Upon being invoked, post-fail agent 310 can copy over the remaining entries in log region 304 (or the entirety of the log region) to remote destination(s) 206 (arrow 312). In this way, post-fail agent 310 can guarantee that all log entries in log region 304 are ultimately copied over to remote destination(s) 206 to enable a crash-consistent restart of application 112', despite the use of asynchronous replication during application runtime by agent 302.

One advantage of the approach/architecture of FIG. 3 over the approach/architecture of FIG. 2 is that the size of log region 304 can be kept small (e.g., a few gigabytes or less) relative to the size of local storage/persistent memory allocation 122, thereby avoiding an overly lengthy post-copy process by post-fail agent 310. Once a local log entry is copied to the remote destination(s) and is processed there, the log entry can be garbage collected and reused.

Another advantage is that, since application 112' itself (via async replication agent 302) is the entity that replicates write data to remote destination(s) 206 during application runtime, application 112' has knowledge of, and thus can replicate, the exact units of data that it writes to local storage/persistent memory allocation 122. For example, if application 112' writes a single byte of new or modified data to allocation 122, agent 302 of application 112' can replicate that single byte, via a corresponding log entry, to remote destination(s) 206. In contrast, application-transparent pre-fail agent 210 of FIG. 2 may (depending on the nature of allocation 122) only be able to track application writes to allocation 122 at the coarse granularity of a page (typically 4 KB in size or larger). Thus, in the example above where application 112' writes a single byte of data to local storage/persistent memory allocation 122, pre-fail agent 210 of FIG. 2 may nevertheless need to copy the entire page in which that byte resides to remote destination(s) 206, which undesirably results in copy amplification.

In the following sections, additional details are provided regarding the implementations of the approaches/architectures shown in FIGS. 2 and 3, as well as various complexities and design considerations pertaining to each. It should be appreciated that FIGS. 2 and 3 are illustrative and not intended to limit the embodiments of the present disclosure. For example, although battery 202 is shown as being an integral part of host system 102, in some embodiments battery 202 may be implemented in a separate enclosure that is coupled with host system 102, such as an external battery or UPS. Further, although only a single application 112' is shown as running on host system 102, multiple applications (each with their own local storage or persistent memory allocation) may be supported by the techniques described herein. Yet further, the various entities shown in FIGS. 2 and 3 may organized according to alternative configurations/arrangements or may include sub-components or functions that are not specifically described. One of ordinary skill in the art will recognize other variations, modifications, and alternatives.

Figure 4:
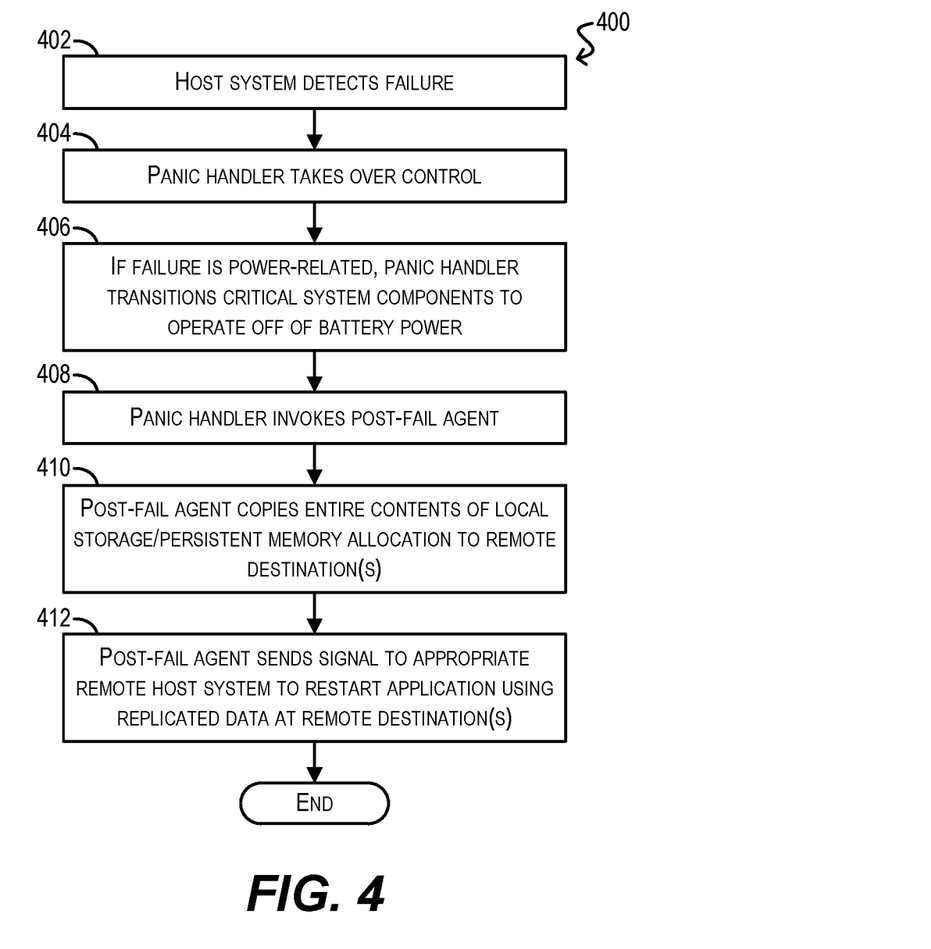
FIG. 4 depicts a workflow for implementing application-transparent battery-backed replication with pre-copying disabled according to an embodiment.

3. Application-Transparent Battery-Backed Replication 3.1 Workflow with Pre-Copying Disabled FIG. 4 depicts a workflow 400 that can be executed by post-fail agent 204 of FIG. 2 for implementing application-transparent battery-backed replication for application 112' with pre-copying disabled according to an embodiment. In other words, workflow 400 assumes that pre-fail agent 210 is not present or is disabled, and thus the entirety of application 112's local persistent data (i.e., local storage/persistent memory allocation 122) is replicated after a host failure occurs (i.e., during the post-copy phase). This embodiment works well in cases where the size of allocation 122 is relatively small, which limits the amount of time needed to complete the post-copy phase. This embodiment can also be useful in cases where there are limited system resources in the deployment environment of application 112', since there is no need to have a remote host system or external storage device in place during the runtime of application 112' to receive pre-copy updates (remote destination(s) 206 only need to be identified and made available at the time of failure).

Starting with block 402, host system 102 can detect the occurrence of a failure that prevents application 112' from continuing its execution. Examples of such failures include, e.g., a loss of AC power, an application or OS-level crash, a "hard" crash caused by, e.g., an uncorrectable memory error, and a system shutdown initiated by a hard press of the system's power button.

At blocks 404 and 406, a panic handler module in the OS or BIOS of host system 102 that is configured to handle the failure can take over control and, if the failure is power-related, can transition certain critical components of system 102 (e.g., CPU, local storage or local persistent memory, network interface) to operate on power provided by battery 202. The panic handler module can then invoke post-fail agent 204 (block 408). As part of this step, in certain embodiments (e.g., in the case of an OS-level crash or hard crash due to an uncorrectable memory error) the panic handler module may shut down the existing instance of the OS kernel and replace it with a minimal and more robust kernel (possibly single-threaded and with few device drivers) using a mechanism such as kexec.

Upon being invoked, post-fail agent 204 can copy the entire contents of local storage/persistent memory allocation 122 to one or more remote destinations 206 (block 410). The choice of remote destination(s) 206 is flexible and can include, e.g., external shared storage devices, the local storage of other host systems, the local persistent memories of other host systems, and so on. Further, the specific communication channel(s) that are used for this copying can differ depending on the type of each remote destination. For example, if remote destination(s) 206 include shared storage, a storage channel/protocol such as iSCSI, NFS, or Fiber Channel may be used. As another example, if remote destination(s) 206 include the local storage or persistent memory of another host system, a network channel/protocol such as remote direct memory access (RDMA) may be used.

Finally, once the entirety of local storage/persistent memory allocation 122 has been successfully copied to remote destination(s) 206, post-fail agent 204 can send a signal to an appropriate remote host system (which may be one of remote destination(s) 206 or a completely different machine) to restart application 112' there using the replicated data on remote destination(s) 206 (block 412) and workflow 400 can end. In some embodiments, post-fail agent 204 may alternatively send this signal at an earlier point in time (e.g., before initiating the copying at block 410) so that the remote host system can "pre-launch" application 112' before all of its persistent data has been replicated (discussed in section 3.5 below).

It should be noted that workflow 400 assumes that remote destination(s) 206 do not have an existing copy of local storage/persistent memory allocation 122 prior to the copying step at block 410, and thus the entirety of the allocation is copied over at block 410. However, in some cases, remote destination(s) 206 may be initialized or "seeded" with an initial copy of allocation 122 (such as, e.g., an initial copy of an application or OS installation for a VM). In these cases, the OS or BIOS of host system 102 can optionally track, during the runtime of application 112', all of the writes that are made to local storage/persistent memory allocation 122 (i.e., the "delta" changes made to allocation 122 since the time of system power-on). Post-fail agent 204 can then copy only these delta changes (rather than the entirety of allocation 122) to remote destination(s) 206 at the time of a failure at block 410, since remote destination(s) 206 already have a copy of the initial version of allocation 122 prior to the delta changes.

3.2 Workflow with Pre-Copying Enabled

Figure 5:
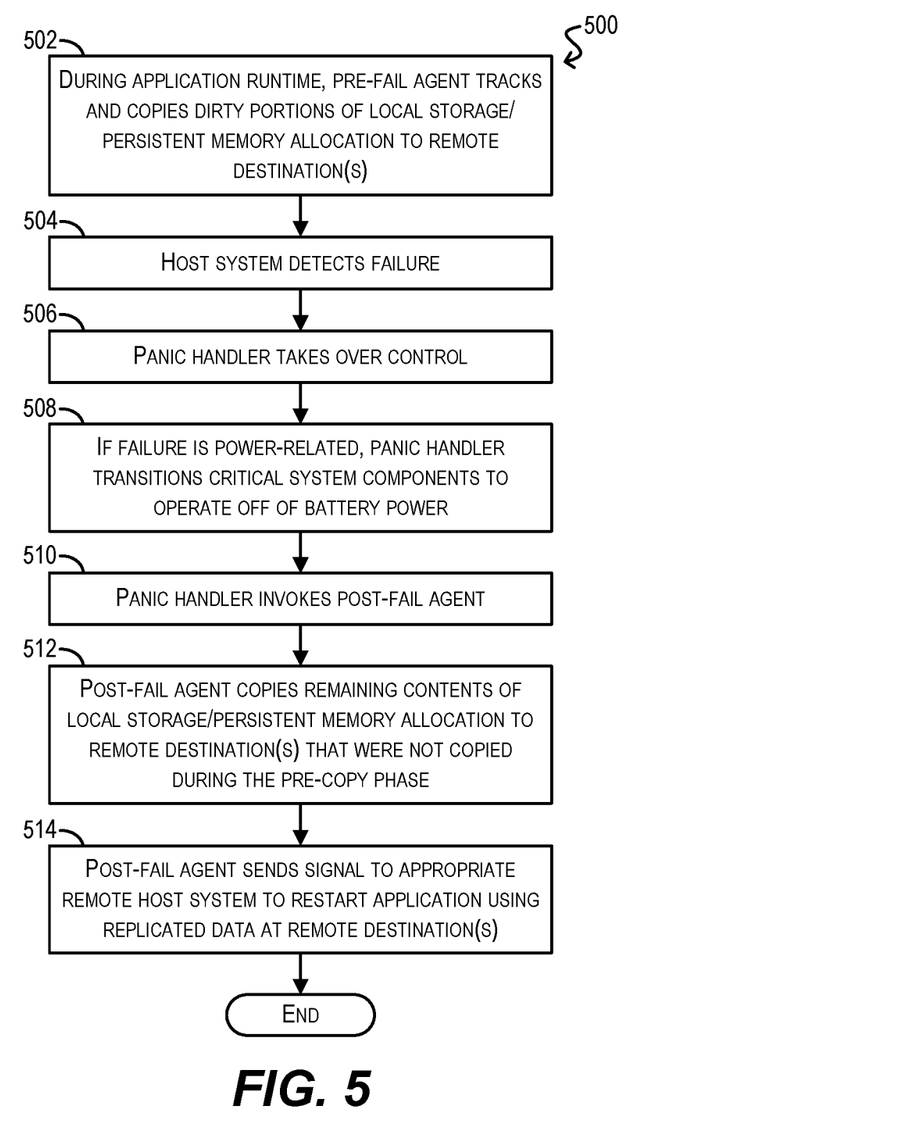
FIG. 5 depicts a workflow for implementing application-transparent battery-backed replication with pre-copying enabled according to an embodiment.

FIG. 5 depicts a workflow 500 that can be executed by pre-fail agent 210 and post-fail agent 204 of FIG. 2 for implementing application-transparent battery-backed replication for application 112' with pre-copying enabled according to an embodiment. As mentioned previously, pre-copying is useful for cases where local storage/persistent memory allocation 122 is large and/or the network bandwidth between host system 102 and remote destination(s) 206 is limited, since it reduces the total amount of data that needs to be replicated by post-fail agent 204 during the post-copy phase. This in turn reduces the length of time needed to complete the post-copying and can establish a limit on both (1) the maximum downtime for application 112' and (2) the maximum required capacity for battery 202.

Starting with block 502, during runtime of application 112', pre-fail agent 210 can track and copy dirty portions of local storage/persistent memory allocation 122 to remote destination(s) 206 that are not yet present there (i.e., the pre-copy phase). Pre-fail agent 210 can perform this tracking and copying in a continuous fashion while application 112' is running normally (i.e., while there is no host failure).

In embodiments where allocation 122 is persistent memory, pre-fail agent 210 (which is implemented at the OS or BIOS level) will not have direct knowledge of when and how the data in allocation 122 is updated by application 112'. Accordingly, in these embodiments, pre-fail agent 210 needs to implement some method of "dirty page tracking" to determine what portions (i.e., pages) of allocation 122 are written. Various possible techniques for performing this dirty page tracking are discussed in section 3.3 below.

Further, since a main goal of the pre-copying performed by pre-fail agent 210 is to limit the amount of dirty data that needs to be replicated during the post-copy phase, in certain embodiments agent 210 may throttle application 112' as part of block 502 if the number of dirty pages in allocation 122 that have not yet been copied to remote destination(s) 206 exceeds, or grows close to, a predefined limit (referred to as the "dirty page limit"). This throttling mechanism is discussed in section 3.4 below.

At block 504, host system 102 can detect the occurrence of a failure that prevents application 112' from continuing its execution. In response, system 102 can carry out a series of steps that are substantially similar to blocks 404-408 of workflow 400 (i.e., appropriate panic handler module takes over control (506), transitions critical system components to operate on power provided by battery 202 (508), and invokes post-fail agent 204 (510)).

Upon being invoked, post-fail agent 204 can copy, to remote destination(s) 206, the remaining dirty portions of local storage/persistent memory allocation 122 that were not copied by pre-fail agent 210 during the pre-copy phase of block 502 (block 512). This can involve, e.g., accessing a data structure that was maintained by pre-fail agent 210 prior to the failure and that identifies the to-be-copied portions of allocation 122. Finally, at block 514, post-fail agent 204 can send a signal to an appropriate remote host system to restart application 112' there using the replicated data on remote destination(s) 206 (in a manner similar to block 412 of workflow 400) and workflow 500 can end. As in workflow 400, post-fail agent 204 can alternatively send this signal at an earlier point in time (e.g., prior to block 512) so that the remote host system can "pre-launch" application 112' before all of its persistent data has been replicated.

3.3 Tracking Dirty Pages

If local allocation 122 is persistent memory, there are a number of ways in which pre-fail agent 210 can track the memory pages of allocation 122 that are dirtied by application 112' for pre-copy purposes. A few of these techniques are described below.

Page faults—with this technique, pages in persistent memory are marked as read-only; when application 112' writes to a page, this causes a page fault which can be detected by pre-fail agent 210. Unfortunately, this technique is expensive from a performance perspective since a page fault can consume thousands of CPU cycles, clears the execution pipeline, and disrupts data fetching logic.

Dirty bit in page table entries—Modern processors support dirty page tracking by recording a dirty bit in a page's entry in the system's page tables, with minimal overhead. Accordingly, with this technique, pre-fail agent 210 can periodically traverse the page table tree to identify pages that have their dirty bit set and can pre-copy those pages to remote destination(s) 206. Further, once a given page has been copied, its dirty bit can be cleared.

It should be noted that there is a subtle race condition with this approach: when a page is pre-copied and its dirty bit is cleared, the application may concurrently write to the page in another thread running on another CPU core. To avoid this, pre-fail agent 210 can alternatively clear the dirty bit first and then pre-copy the page (not the other way around).

This dirty bit technique is generally more efficient than page faults, but incurs an overhead of traversing the page table tree, clearing dirty bits, and invalidating TLB entries. Another drawback is that this technique requires a more sophisticated mechanism to throttle application writes (as discussed below).

Page modification logging—In addition to marking page-level dirty bits in the page tables, modern processors can also record modified pages in a log (known as the page modified list, or PML) stored in volatile memory. A log entry is added to the PML every time the first byte in a clean page is written to. Thus, by examining the PML, pre-fail agent 210 can track which pages are dirtied.

As with the dirty bit technique, this PML technique is susceptible to a race condition and requires the PML to be purged of a given page before that page is pre-copied.

Application notification—With this technique, application 112' can be configured to notify the system OS (and thus pre-fail agent 210) when it writes to persistent memory. This technique is the most precise tracking method, but requires the application to be explicitly designed to support it.

3.4 Application Throttling

As discussed with respect to FIG. 5, in some embodiments pre-fail agent 210 may throttle application 112' during its runtime in order to keep the number of dirty pages in local storage/persistent memory allocation 122 below a pre-defined dirty page limit. As used herein, "throttling" an application refers to temporarily pausing execution of the application. The way in which this throttling is implemented can differ depending on the technique used to track dirty pages. For example, if the page fault technique is used, application 112' can be throttled directly when a write occurs that triggers the page fault handler.

If the dirty bit technique is used, application 112' can be throttled in an indirect manner that involves careful CPU scheduling of the application. Once the application is scheduled, it could dirty pages at a high rate; to avoid this, the highest such rate can be calculated based on the speed of a cache miss, and the application can then be scheduled for a CPU time slice that does not permit the application to exceed the dirty page limit.

And if the PML technique is used, application 112' can be throttled when the PML becomes full, which traps into OS 110. The PML has a limited number of entries (e.g., 512 in Intel processors), and so this approach can enforce a hard limit on dirtiness.

One issue with simply throttling application 112' when the dirty page limit is reached is that the application can experience significant jitter in performance, which is undesirable. To avoid this, a low and high watermark for the dirty page limit can be defined. When the low watermark is reached, pre-fail agent 210 can introduce a small throttling delay to application 112', and this delay can be gradually increased as the high watermark is approached.

3.5 Fast Start

In scenarios where local allocation 122 of application 112' is persistent memory and remote destination 206 is external shared storage, the total delay in restarting application 112' on another (i.e., remote) host system when original host system 102 fails is caused by four actions: (1) detecting that application 112' is down, (2) copying the dirty local persistent data of application 112' to shared storage, (3) copying the data from shared storage to the local persistent memory of the remote host system, and (4) launching application 112' on the remote host system.

Actions (1) and (4) can take a few seconds, while (2) and (3) can potentially take minutes or hours. Thus, in certain embodiments the two mechanisms described below may be implemented to reduce the impact of (2) and (3) significantly.

Pre-launching—With this mechanism, application 112' is restarted on the remote host system even before (2) and (3) are completed; paging is then used if the restarted application needs a missing page that has not yet been propagated to the local persistent memory of the remote host system. This should be done carefully, because a missing page may not have been copied to shared storage yet (if it is still in the process of being replicated from original host system 102). To deal with this issue, the shared storage can maintain a fresh bitmap indicating whether each of its pages are in sync with the persistent memory allocation on host system 102. Prior to launching the new instance of application 112' on the remote host system, original host system 102 can clear the bits of all pages that remain dirty in allocation 122 and set the other bits. If the new instance of application 112' running on the remote host system faults on a missing page, it can check if the fresh bitmap on the shared storage is set; if so, it can fetch the page as paging would normally do; otherwise, the application must wait until the bit is set.

The foregoing process may be optimized in two ways. First, host system 102 can copy the persistent data for application 112' directly into the local persistent memory of the remote host system, instead of going through the external shared storage. Second, the fresh bitmap can be stored on the remote host system, and host system 102 can directly update the bitmap in the remote host.

Pre-loading into free memory—Another mechanism that can improve availability involves pre-loading the contents of the external shared storage into free memory of the remote host system even before the failure of application 112' on host system 102. This idea is different from pre-copying as discussed in workflow 500, because here the contents are stored in the free space of the remote host system and this space can be erased and allocated for other purposes if the remote host needs memory. Furthermore, application 112' can be launched on another host system if desired (but in this case, it will not take advantage of pre-loading), so we retain the flexibility of restarting the application anywhere. This is useful in cases when the pre-loaded remote host system has lost its power too. When the application is restarted on the preloaded remote host system, the pre-loaded space can simply be allocated to the application, which avoids the cost and delay of copying the data from the external storage.

This mechanism has three costs: network bandwidth, CPU usage in the remote host system, and the cost of erasing a pre-loaded page if it is allocated for another purpose. These costs can be mitigated to an extent by pre-loading only when the network and remote CPU are underutilized.

3.6 Apportioning Crash Copy Capacity and Deciding What to Pre-Copy

Although FIG. 2 depicts a single application 112' on host system 102, in some scenarios there may be multiple application running concurrently on system 102 that write persistent data to local storage/persistent memory and that need to be restarted in an expedient manner on another host system if system 102 fails. For these scenarios, a decision needs to be made on how to divide the "crash copy capacity" of host system 102 (i.e., the amount of persistent data that can be copied externally when the system crashes) among the applications. This decision is not obvious, since different applications may benefit from more capacity in different ways; for example, one application might obtain a large benefit by increasing its crash copy capacity by 10%, while another application may obtain no benefit. In addition, a decision needs to be made on which dirty portions (e.g., pages) of each application to copy.

In various embodiments, the foregoing problems can be solved by applying traditional cache management and page replacement techniques. More particularly, the crash copy capacity can be thought of as the size of a cache in a file system, the dirty pages as the pages in the cache, and the pre-copying as writing back pages to disk. Further, choosing a page to pre-copy can correspond to evicting a page from the cache and apportioning crash copy capacity can correspond to allocating cache space among applications. Since the bandwidth to remote destination(s) 206 will generally be limited, eviction has a limited rate. This rate can be controlled by throttling insertions into the cache, since evictions are caused by insertions.

With this insight, we can benefit from the existing literature on cache management and replacement and use algorithms such as least recently used globally, or least recently used per application, to avoid pre-copying frequently modified pages. We can also throttle application writes so that they each consume the same amount of bandwidth to the remote destination(s).

4. Crash-Consistent Asynchronous Replication 4.1 Workflow

Figure 6:
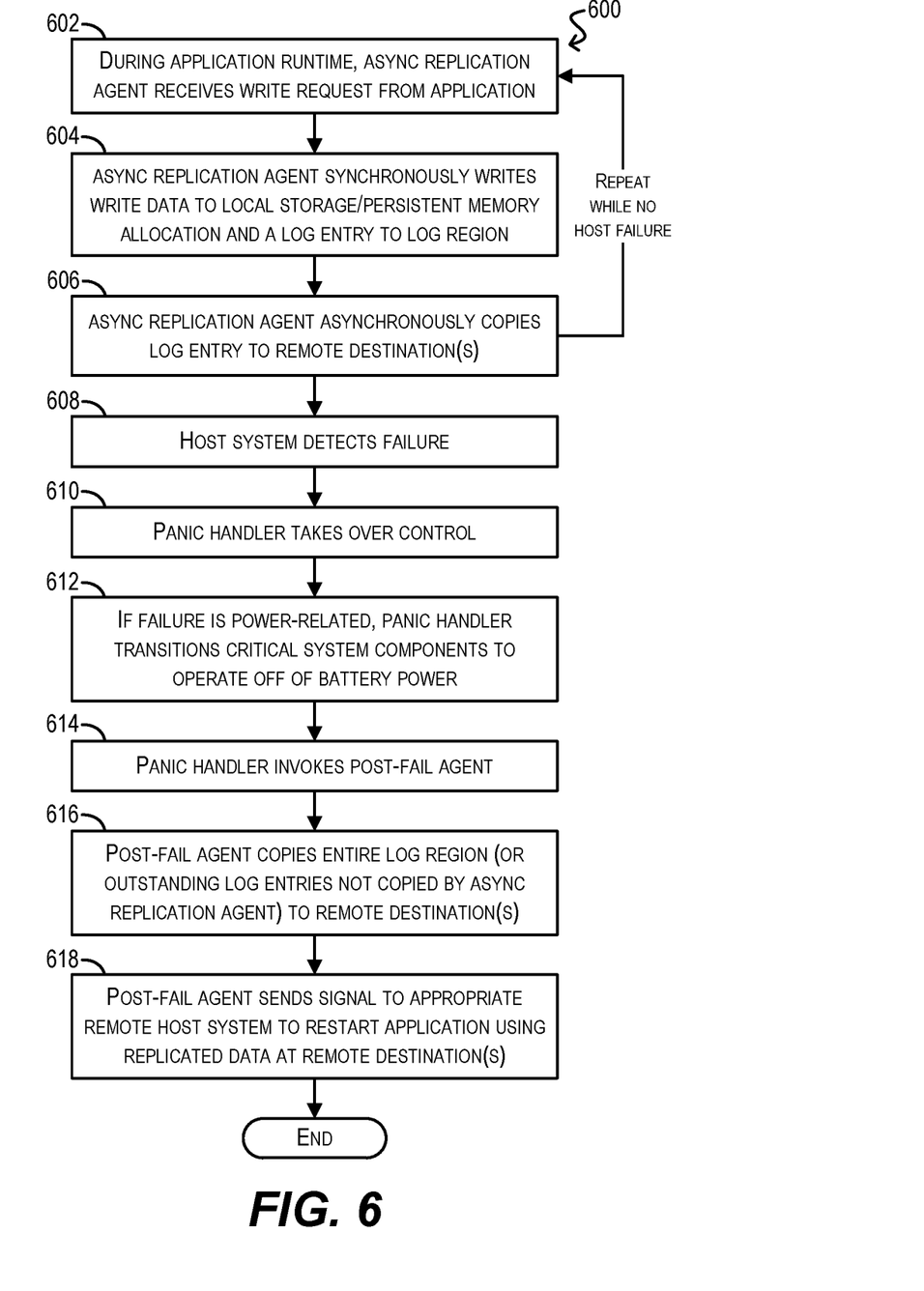
FIG. 6 depicts a workflow for implementing crash-consistent asynchronous replication according to an embodiment.

FIG. 6 depicts a workflow 600 that can be executed by async replication agent 302 and post-fail agent 310 of FIG. 3 for implementing crash-consistent asynchronous replication for application 112' according to an embodiment.

Recall that while the application-transparent battery-backed replication approach discussed above works well for many cases, copy amplification may occur when pre-copying is enabled (i.e., pre-fail agent 210 copies more data to remote destination(s) 206 than what application 112' actually writes to local storage/persistent memory allocation 122). This is a consequence of the fact that pre-fail agent 210 tracks modifications to local storage/persistent memory allocation 122 in a manner that is transparent to application 112', which can generally only be done at the coarse granularity of a page; thus, if application 112' modifies just one byte of data, pre-fail agent 210 will consider the whole page on which that word resides to be dirty and pre-copy the entire page to remote destination(s) 206. If the degree of copy amplification is high, the amount of network bandwidth between host system 102 and remote destination(s) 206 may be exceeded during the pre-copy phase, which may cause system 102 to throttle application 112' (as described in section 3.4) to keep the amount of dirty data in local storage/persistent memory allocation 122 below a target level.

The asynchronous replication workflow of FIG. 6 addresses this issue because application 112' itself (via async replication agent 302) is in control of the pre-copy phase, rather than the system OS or BIOS. Thus, the application can replicate the exact portions of data that it modifies in local allocation 122, resulting in no copy amplification. Further, by performing the replication asynchronously during application runtime and then leveraging battery 202/post-fail agent 310 to replicate outstanding data (i.e., log entries) post-failure, this approach can offer the same crash consistency guarantees as conventional synchronous replication but without a significant hit to application runtime performance.

Starting with block 602 of workflow 600, during runtime of application 112', async replication agent 302 can receive a write request from application 112' for writing a piece of data to local storage/persistent memory allocation 122. At block 604, async replication agent 302 can synchronously write the data to allocation 122 and to a log entry in local log region 304. Async replication agent 302 can then asynchronously send the log entry to remote destination(s) 206, such that the log entry is copied to remote destination(s) 206 in the background while application 112' continues its execution (block 606). Blocks 602-606 can repeat while application 112' is running normally (i.e., while there is no host failure). Although not shown, when remote destination(s) 206 receive the log entry, they can apply the log entry to their local persistent state and can send an acknowledgement to async replication agent 302. Upon receiving this acknowledgement, async replication agent 302 can garbage collect the log entry in log region 304.

In addition, if application 112' writes log entries too quickly to log region 304 (such that log region 304 becomes full), async replication agent 302 may stall application 112' while it frees up older, processed entries from the log region (discussed in section 4.2 below).

At block 608, host system 102 can detect the occurrence of a failure that prevents application 112' from continuing its execution. In response, system 102 can carry out a series of steps that are similar to blocks 404-408 of workflow 400 (i.e., appropriate panic handler module takes over control (610), transitions critical system components to operate on power provided by battery 202 (612), and invokes post-fail agent 310 (614)).

Upon being invoked, post-fail agent 310 can copy the entirety of log region 304 (or alternatively, just the outstanding log entries in log region 304 that were not previously copied by async replication agent 302) to remote destination(s) 206 (block 616). Remote destination(s) 206 can use this information to bring its persistent state fully up-to-date with local allocation 122 of host system 102. For example, in cases where remote destination(s) 206 receive the entirety of log region 304 from post-fail agent 310, remote destination(s) 206 can replay, in order, every log entry in log region 304 (this assumes that the log entries are idempotent). In cases where remote destination(s) 206 receive just the outstanding log entries from post-fail agent 310, remote destination(s) 206 can replay those outstanding log entries.

Finally, at block 618, post-fail agent 310 can send a signal to an appropriate remote host system to restart application 112' there using the replicated data on remote destination(s) 206 (in a manner similar to block 412 of workflow 400) and workflow 600 can end. As in workflow 400, post-fail agent 310 can alternatively send this signal at an earlier point in time (e.g., prior to block 616) so that the remote host system can "pre-launch" application 112' before all of the log entries have been replicated.

4.2 Size of Log Region

Generally speaking, it is preferable to keep the size of log region 304 relatively small as that reduces the total amount of time needed to complete the post-failure copying performed by post-fail agent 310. However, a log region size that is too small can also affect performance in an undesirable way because an update to the log region can be garbage collected only after remote destination(s) 206 have acknowledged receiving it; if host system 102 runs out of space in log region 304, it must pause until it can garbage collect some log entries.

To avoid this performance disruption, in some embodiments the size of log region 304 can be set to equal the maximum number of unacknowledged log updates sent by host system 102 to remote destination(s) 206. This number equals the maximum rate of write requests that application 112' can issue, multiplied by the maximum round-trip latency for remote destination(s) 206 to acknowledge a log update. In practice, this number will generally be a tiny fraction of the total size of local storage/persistent memory allocation 122.

4.3 Provisioning a New Remote Destination

If a remote destination fails or gets promoted to "primary" (i.e., takes over execution of application 112' from original host system 102), a new remote destination should be provisioned to retain the same level of redundancy. This can be achieved in a manner similar to asynchronous replication, but (1) using the log region to store additional updates while the primary copies its persistent state to the new remote destination, and (2) using an optimization to keep the log region small.

More precisely, this can be achieved in two phases. In phase one, the persistent state of the primary can be copied to the new remote destination; since this can take significant time, the copying can occur while the primary continues to serve write requests from application 112'. The primary records the write requests via log entries in the log region. In phase two, the primary sends the log entries to the new remote destination and the remote destination applies them. Once this is done, the remote destination can operate normally (per workflow 600 of FIG. 6). To ensure consistency, either the primary should copy from a snapshot in phase one, or the log updates in phase two should be applicable to a state in the new remote destination that might contain updates that have been copied partially from the primary. To reduce the size of the log region, a maximum size can be chosen; if the log region gets full in phase one, the primary can transfer log entries to the new remote destination and then garbage collect them. The new remote destination can simply buffer these log entries for later processing (it should not apply them until phase one is completed, otherwise consistency may be lost).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for achieving application high availability via application-transparent battery-backed replication, the method comprising:
tracking, by a computer system, one or more portions of a local storage or persistent memory allocation of the computer system that are dirtied by an application during the application's runtime and periodically copying the one or more portions to one or more remote destinations, wherein the application is throttled by a first delay if a size of the one or more portions exceeds a first predefined threshold before the one or more portions can be copied, and wherein the first delay is gradually increased as the size of the one or more portions approaches a second predefined threshold higher than the first predefined threshold;
detecting, by a computer system, a failure that causes the application to stop running;
in response to the detecting, identifying, by the computer system, one or more remaining portions of the local storage or persistent memory allocation that have been dirtied by the application but have not yet been copied to the one or more remote destinations; and
copying, by the computer system, the one or more remaining portions to the one or more remote destinations, without copying the one or more portions previously copied to the one or more remote destinations prior to the failure,
wherein the copying of the one or more remaining portions is performed while the computer system runs on power provided by a battery and in a manner that is transparent to the application, and
wherein the application is restarted on another computer system using the copied portions.

2. The method of claim 1 wherein the failure is of a type that enables the computer system to execute panic code for a period of time after the failure.

3. The method of claim 1 wherein the one or more remote destinations include shared storage, a local storage of another computer system, or a local persistent memory of another computer system.

4. The method of claim 1 wherein the copying of the one or more remaining portions is performed by a post-fail agent implemented in an operating system (OS) or Basic Input/Output System (BIOS) of the computer system.

5. A non-transitory computer readable storage medium having stored thereon program code executable by a computer system, the program code embodying a method for achieving application high availability via application-transparent battery-backed replication, the method comprising:
tracking one or more portions of a local storage or persistent memory allocation of the computer system that are dirtied by an application during the application's runtime and periodically copying the one or more portions to one or more remote destinations, wherein the application is throttled by a first delay if a size of the one or more portions exceeds a first predefined threshold before the one or more portions can be copied, and wherein the first delay is gradually increased as the size of the one or more portions approaches a second predefined threshold higher than the first predefined threshold;
detecting a failure that causes the application to stop running;
in response to the detecting, identifying one or more remaining portions of the local storage or persistent memory allocation that have been dirtied by the application but have not yet been copied to the one or more remote destinations; and
copying the one or more remaining portions to the one or more remote destinations, without copying the one or more portions previously copied to the one or more remote destinations prior to the failure,
wherein the copying of the one or more remaining portions is performed while the computer system runs on power provided by a battery and in a manner that is transparent to the application, and
wherein the application is restarted on another computer system using the copied portions.

6. The non-transitory computer readable storage medium of claim 5 wherein the failure is of a type that enables the computer system to execute panic code for a period of time after the failure.

7. The non-transitory computer readable storage medium of claim 5 wherein the one or more remote destinations include shared storage, a local storage of another computer system, or a local persistent memory of another computer system.

8. The non-transitory computer readable storage medium of claim 5 wherein the copying of the one or more remaining portions is performed by a post-fail agent implemented in an operating system (OS) or Basic Input/Output System (BIOS) of the computer system.

9. A computer system comprising:
a battery;
a BIOS (Basic Input/Output System);
an operating system (OS);
a nonvolatile data store; and
a non-transitory computer readable medium having stored thereon program code for achieving application high availability via application-transparent battery-backed replication, the program code causing the computer system to:
track one or more portions of the nonvolatile data store that are dirtied by an application during the application's runtime and periodically copy the one or more portions to one or more remote destinations, wherein the application is throttled by a first delay if a size of the one or more portions exceeds a first predefined threshold before the one or more portions can be copied, and wherein the first delay is gradually increased as the size of the one or more portions approaches a second predefined threshold higher than the first predefined threshold;
detect a failure that causes the application to stop running;
in response to the detecting, identify one or more remaining portions of the nonvolatile data store that have been dirtied by the application but have not yet been copied to the one or more remote destinations; and
copy the one or more remaining portions to the one or more remote destinations, without copying the one or more portions previously copied to the one or more remote destinations prior to the failure, wherein the copying of the one or more remaining portions is performed while the computer system runs on power provided by the battery and in a manner that is transparent to the application, and wherein the application is restarted on another computer system using the copied portions.

10. The computer system of claim 9 wherein the failure is of a type that enables the computer system to execute panic code for a period of time after the failure.

11. The computer system of claim 9 wherein the one or more remote destinations include shared storage, a local storage of another computer system, or a local persistent memory of another computer system.

12. The computer system of claim 9 wherein the copying of the one or more remaining portions is performed by a post-fail agent implemented in the OS or BIOS of the computer system.

13. A method for achieving application high availability via application-transparent battery-backed replication, the method comprising:

tracking, by a computer system, one or more memory pages of a local storage or persistent memory allocation of the computer system that are dirtied by an application during the application's runtime, the tracking comprising:
marking all memory pages in the local storage or persistent memory allocation as read-only; and
detecting a page fault indicating that the application has written data to one or more of the memory pages marked as read-only;

periodically copying the one or more memory pages to one or more remote destinations, wherein the application is throttled if a size of the one or more memory pages exceeds a first predefined threshold before the one or more memory pages can be copied;

detecting, by a computer system, a failure that causes the application to stop running;

in response to the detecting, identifying, by the computer system, one or more remaining memory pages of the local storage or persistent memory allocation that have been dirtied by the application but have not yet been copied to the one or more remote destinations; and copying, by the computer system, the one or more remaining memory pages to the one or more remote destinations, without copying the one or more memory pages previously copied to the one or more remote destinations prior to the failure, wherein the copying of the one or more remaining memory pages is performed while the computer system runs on power provided by a battery and in a manner that is transparent to the application, and wherein the application is restarted on another computer system using the copied memory pages.

14. A non-transitory computer readable storage medium having stored thereon program code executable by a computer system, the program code embodying a method for achieving application high availability via application-transparent battery-backed replication, the method comprising:

tracking one or more memory pages of a local storage or persistent memory allocation of the computer system that are dirtied by an application during the application's runtime, the tracking comprising:
marking all memory pages in the local storage or persistent memory allocation as read-only; and
detecting a page fault indicating that the application has written data to one or more of the memory pages marked as read-only;

periodically copying the one or more memory pages to one or more remote destinations, wherein the application is throttled if a size of the one or more memory pages exceeds a first predefined threshold before the one or more memory pages can be copied;

detecting a failure that causes the application to stop running;

in response to the detecting, identifying one or more remaining memory pages of the local storage or persistent memory allocation that have been dirtied by the application but have not yet been copied to the one or more remote destinations; and copying the one or more remaining memory pages to the one or more remote destinations, without copying the one or more memory pages previously copied to the one or more remote destinations prior to the failure, wherein the copying of the one or more remaining memory pages is performed while the computer system runs on power provided by a battery and in a manner that is transparent to the application, and wherein the application is restarted on another computer system using the copied memory pages.

15. A computer system comprising:

a battery;
a BIOS (Basic Input/Output System);
an operating system (OS);
a nonvolatile data store; and
a non-transitory computer readable medium having stored thereon program code for achieving application high availability via application-transparent battery-backed replication, the program code causing the computer system to:
track one or more memory pages of the nonvolatile data store that are dirtied by an application during the application's runtime by:
marking all memory pages in the nonvolatile data store as read-only; and
detecting a page fault indicating that the application has written data to one or more of the memory pages marked as read-only;
periodically copy the one or more memory pages to one or more remote destinations, wherein the application is throttled if a size of the one or more memory pages exceeds a first predefined threshold before the one or more memory pages can be copied;
detect a failure that causes the application to stop running;
in response to the detecting, identify one or more remaining memory pages of the nonvolatile data store that have been dirtied by the application but have not yet been copied to the one or more remote destinations; and
copy the one or more remaining memory pages to the one or more remote destinations, without copying the one or more memory pages previously copied to the one or more remote destinations prior to the failure, wherein the copying of the one or more remaining memory pages is performed while the computer system runs on power provided by the battery and in a manner that is transparent to the application, and wherein the application is restarted on another computer system using the copied memory pages.

\* \* \* \* \*